Oct. 24, 1950     K. J. HERSEY ET AL     2,526,866

WHEEL SUSPENSION

Filed Jan. 8, 1947     2 Sheets-Sheet 1

Inventor
KENNETH J. HERSEY
ARTHUR J. HERSEY

By Carlsen + Hayle
Attorney

Oct. 24, 1950   K. J. HERSEY ET AL   2,526,866
WHEEL SUSPENSION
Filed Jan. 8, 1947   2 Sheets-Sheet 2
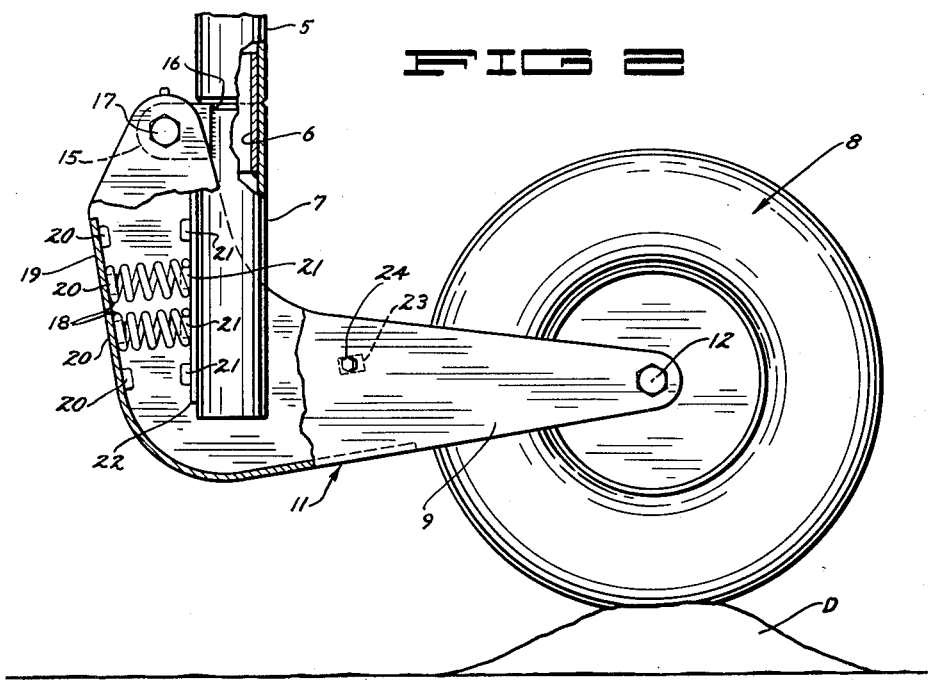
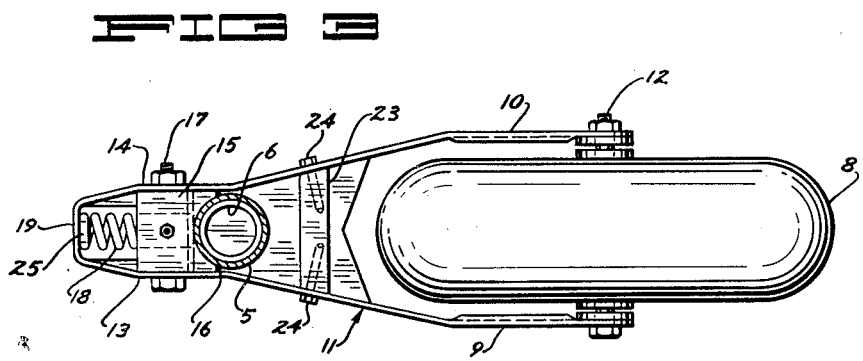
Inventor
KENNETH J. HERSEY
ARTHUR J. HERSEY
By Carlsen + Hagle
Attorney Patented Oct. 24, 1950

2,526,866

UNITED STATES PATENT OFFICE 2,526,866

WHEEL SUSPENSION

Kenneth J. Hersey and Arthur J. Hersey,
Minneapolis, Minn.

Application January 8, 1947, Serial No. 720,904

5 Claims. (Cl. 267—20)

This invention relates to improvements in vehicle wheel suspensions for trailers and the like and the primary object is to provide resilient suspension means for the wheel or wheels of the vehicle which is simple and practical in construction, readily adjustable according to the load on the vehicle, and which will effectively absorb the shocks incident to travel of the vehicle over irregular road surfaces.

Another object is to provide a vehicle wheel suspension in which the wheel is mounted for up and down movements as it encounters irregularities in road surface and arranged with springs to yieldably resist upward movement of the wheel and to transmit road shocks to the vehicle in a substantially horizontal and longitudinal plane with very little upward component. Thus comparatively great up and down movements of the wheel may occur with very little corresponding movement of the vehicle itself so that it rides evenly and smoothly over even the roughest road surfaces.

These and other more detailed and specific objects will be disclosed in the course of the following specification, reference being had to the accompanying drawings, in which—

Fig. 2 is an enlarged side elevational view of the wheel suspension means alone, illustrating the action thereof as the wheel travels over an upward protrusion on the road surface, and with a part of the structure broken away to show the spring arrangement.

Fig. 3 is a top plan view of the assembly shown in Fig. 2.

Figure 1:
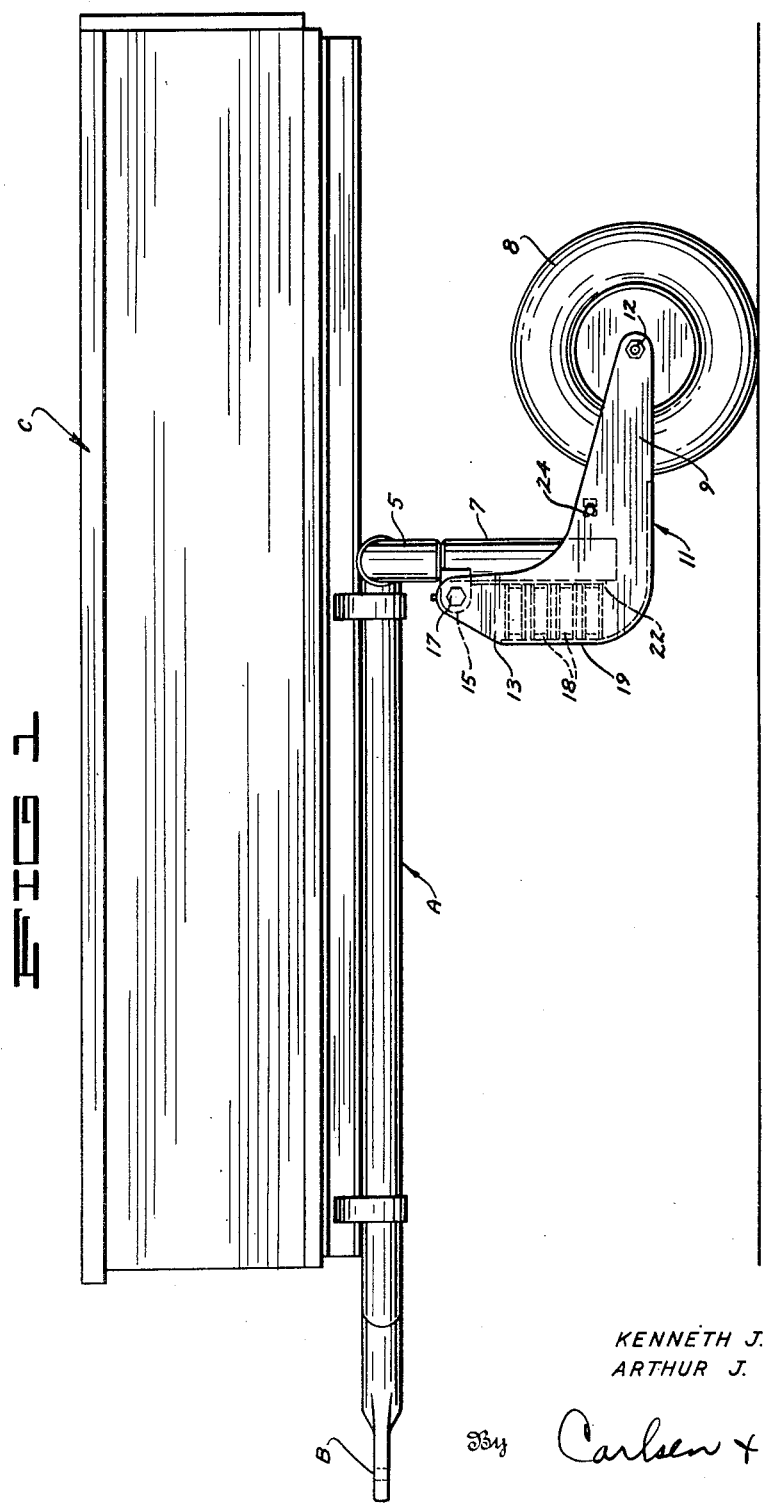
Fig. 1 is a side elevation of a trailer equipped with wheel suspension means according to our invention.

We have shown our invention herein in connection with a conventional form of trailer having a frame A with a hitch B at its forward end for connection to the towing vehicle and with a bow or box C to carry the load. This showing is, of course, for example only, and we may employ our improved wheel suspension in connection with other types of vehicles as will be understood.

The vehicle of whatever kind will be provided at each side with a depending shank indicated at 5 which acts as the primary support for the wheel suspension and while only one such support and wheel assembly is here shown, it will be readily understood that the units at opposite sides of the vehicle will be identical and further, that a single wheel suspension may be used for the smaller, one-wheel trailers. The shank 5 has a tubular insert or sleeve 6 secured in and depending from its lower end, as shown in Fig. 2, and the sleeve 6 enters the upper end of a tubular wheel support or mounting member indicated at 7. This mounting member 7 is arranged to turn about an upright axis with respect to the sleeve 6 to permit castering movements of the wheel in a well-known manner. Obviously, however, the mounting member 7 may be welded or otherwise rigidly attached to the shank 5 where such castering movements are not desired.

The wheel suspension includes, of course, a ground wheel, designated generally at 8, of the usual pneumatic tired variety and this wheel is rotatably mounted between the transversely spaced rear ends 9—10 of a wheel fork or supporting arm indicated at 11. Any conventional form of axle pin 12 may be used to so mount the wheel. The fork or arm 11 may be nicely formed up from sheet material, as here shown, and is angularly shaped in such a manner that the ends 9—10 extend forwardly from the wheel 8 and then turn upwardly alongside and forwardly of the mounting member 7. This upwardly turned forward end portion of the arm 11 has spaced sides 13—14 which at their upper extremities are positioned alongside a pivot ear or lug 15 rigidly welded as at 16 to the upper end of the mounting member 7 on its forward side. A pivot pin or bolt 17 connects these side portions 13—14 to the lug 15 and the mounting is thus such that the wheel supported rear end of the arm 11 may move upwardly and downwardly as the arm as a whole swings in a vertical, longitudinal plane about this transverse horizontal pivot axis between the arm and the mounting member 7.

Upward movements of the arm 11 at its rear end are yieldably resisted by one or more expansion coil springs, indicated at 18, which are braced between the forward side of the mounting member 7 and the closed upright forward end 19 of the arm which joins the aforesaid side portions 13—14 thereof. As here shown two of such springs 18 are employed, and for the accommodation of these springs, we provide upon the aforesaid closed end 19 of the arm a plurality of vertically spaced bosses or rests 20 over which the forward ends of the springs may be placed as clearly shown. The rear ends of the springs engage similar rests 21 provided on a plate 22 welded vertically along the forward side of the mounting member 7. It will be noted that we provide a plurality of the rests 20—21 in vertically spaced relation thus allowing the use of as many as four springs, as here shown, or the adjustment of a lesser number of springs to different positions with respect to the pivot 17 of the arm 11. It will thus be readily appreciated that the springs may be selected in number or adjusted in position to vary the resistance to upward movement of the wheel 8 in accordance with the weight of the vehicle or the load thereon. Obviously, the leverage exerted on the springs by movements of the wheel 8 will vary according to the position of the springs with respect to the arm pivot 17 and the vertical spacing between the rests 20—21 will permit this leverage to be selected to operate to best advantage under different load conditions. To change the positions of the springs, or to insert new ones, it is merely necessary to jack up the vehicle allowing the arm 11 to swing downwardly at its rear end and thus provide clearance for work on the springs. Normally such downward movements of the arm 11 are limited to a point such that the springs can not escape from their seats by means of a transverse stop bar 23 secured between the sides of the arm 11 by means of cap screws 24. This stop bar 23 is located rearwardly of and in spaced relation to the mounting member 7 but is arranged to contact the rear lower end of that member should the arm swing down to a point to bring this about. Normally, of course, the stop bar will have no effect on the upward and downward movement of the arm as the wheel travels over the road. When changing or adjusting the springs the stop bar is removed allowing the arm to be swung far enough forward for work on the springs.

It will be readily understood from the foregoing that the springs 18 will resiliently absorb road shocks and will allow the wheel 8 to travel over obstacles or protrusions on the road surface, such as indicated at D, while absorbing the shocks in the usual manner. Attention is called to the fact, however, that the springs are arranged on substantially horiontal axes in such a manner that the shock forces will be transmitted from the wheel to the mounting member 7 and thence to the vehicle along lines extending substantially horizontally, and in a fore and aft direction. It will further be apparent that since the springs engage the arm 11 at points spaced well forward of a vertical plane passing through the pivot 17, the springs thus engage the arm at points where it swings in a substantially horizontal arc. As a result, there is very little upward component of force exerted upon the vehicle and load shocks are absorbed with far less tendency to raise the vehicle than is the case where the springs are more or less vertically positioned and the forces are exerted upwardly as the wheel travels over a protrusion in the road surface. We find in actual practice that our wheel suspension mechanism, as here described and due primarily to this spring arrangement is such that the forces are transmitted from wheel to vehicle along horizontal lines and the vehicle will operate over very irregular road surfaces with but little up and down vibration of the vehicle itself.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a vehicle wheel suspension, an upright support depended from the vehicle, an arm member pivoted at one end to the support and extending first downwardly ahead of the support and then rearwardly thereof, a ground wheel supporting the rear end of the arm and adapted to move upwardly and downwardly as it travels over irregular road surfaces, spring rests arranged along both the forward side of the support and upright forward portion of the arm member, and expansion coil springs selectively engaging the rests to yieldably resist the upward movements of the wheel, the said rests being spaced at varying distances from the pivot connection of the arm member whereby selective positioning of the springs will regulate the effective spring resistance to the supported load.

2. In a vehicle wheel suspension, an upright support depending vertically from the vehicle, an arm member pivoted at its upper end to the support and extending first downwardly ahead of and substantially parallel to the support and then rearwardly thereof, a ground wheel supporting the rear end of the arm and adapted to move upwardly and downwardly as it travels over irregular road surfaces, and at least one spring braced horizontally between the support and the forward portion of the arm to transmit vertical shock movement of the wheel along a horizontal line to the vertical support.

3. A vehicle wheel suspension comprising an elongated oscillatable spindle depending vertically from the vehicle, a wheel supported suspension arm pivoted at its upper end to the upper end of the spindle and having a portion extending downwardly in spaced relation forwardly of the spindle body, the arm then extending rearwardly to the supporting wheel whereby vertical movement of the wheel will be translated into generally horizontal movement of the first mentioned arm portion, and a compression spring disposed in a generally horizontal position between the spindle and said arm portion at a level substantially below the level of said arm and spindle pivot connection to resist relative upward movement of the wheel with respect to the vehicle.

4. In a vehicle wheel suspension, an upright support depending from the vehicle, a generally L-shaped arm member pivoted at its upper end to the support and extending first downwardly ahead of the support and then rearwardly thereof, a ground wheel supporting the rear end of the arm and adapted to move upwardly and downwardly as it travels over irregular road surfaces, pairs of opposing spring rests arranged along the forward side of the support and the upright forward portion of the arm member, and expansion coil springs engaging selected pairs of said spring rests to variably resist upward movements of the wheel.

5. In a vehicle wheel suspension, a support member depending from the vehicle, an arm member pivoted at its upper forward end to the support and extending first downwardly and then rearwardly under the support, a ground wheel supporting the rear end of the arm, at least one spring braced between the support and the upper forward portion of the arm member for yieldably resisting upward movement of the wheel about the pivot, a removable stop member secured to the rearwardly extending portion of the arm and adapted to limit downward movement of the wheel by engaging the support.

KENNETH J. HERSEY.
ARTHUR J. HERSEY.

REFERENCES CITED

The following references are of record in the file of this patent:

UNITED STATES PATENTS

| Number | Name | Date |
|---|---|---|
| 862,556 | Handy | Aug. 6, 1907 |
| 2,033,298 | Pribil | Mar. 10, 1936 |
| 2,033,721 | Liron et al. | Mar. 10, 1936 |
| 2,078,932 | Christman | May 4, 1937 |
| 2,080,546 | Rudoni | May 18, 1937 |

FOREIGN PATENTS

| Number | Country | Date |
|---|---|---|
| 186,755 | Great Britain | Oct. 12, 1922 |
| 523,115 | Great Britain | July 5, 1940 |
| 216,093 | Switzerland | July 31, 1941 |